Jan. 1, 1963  F. C. SLOAN  3,071,407
TRANSVERSELY MOVABLE PASSENGER SEAT FOR
AUTOMOBILES, TAXICABS AND THE LIKE
Filed July 11, 1960  6 Sheets-Sheet 1
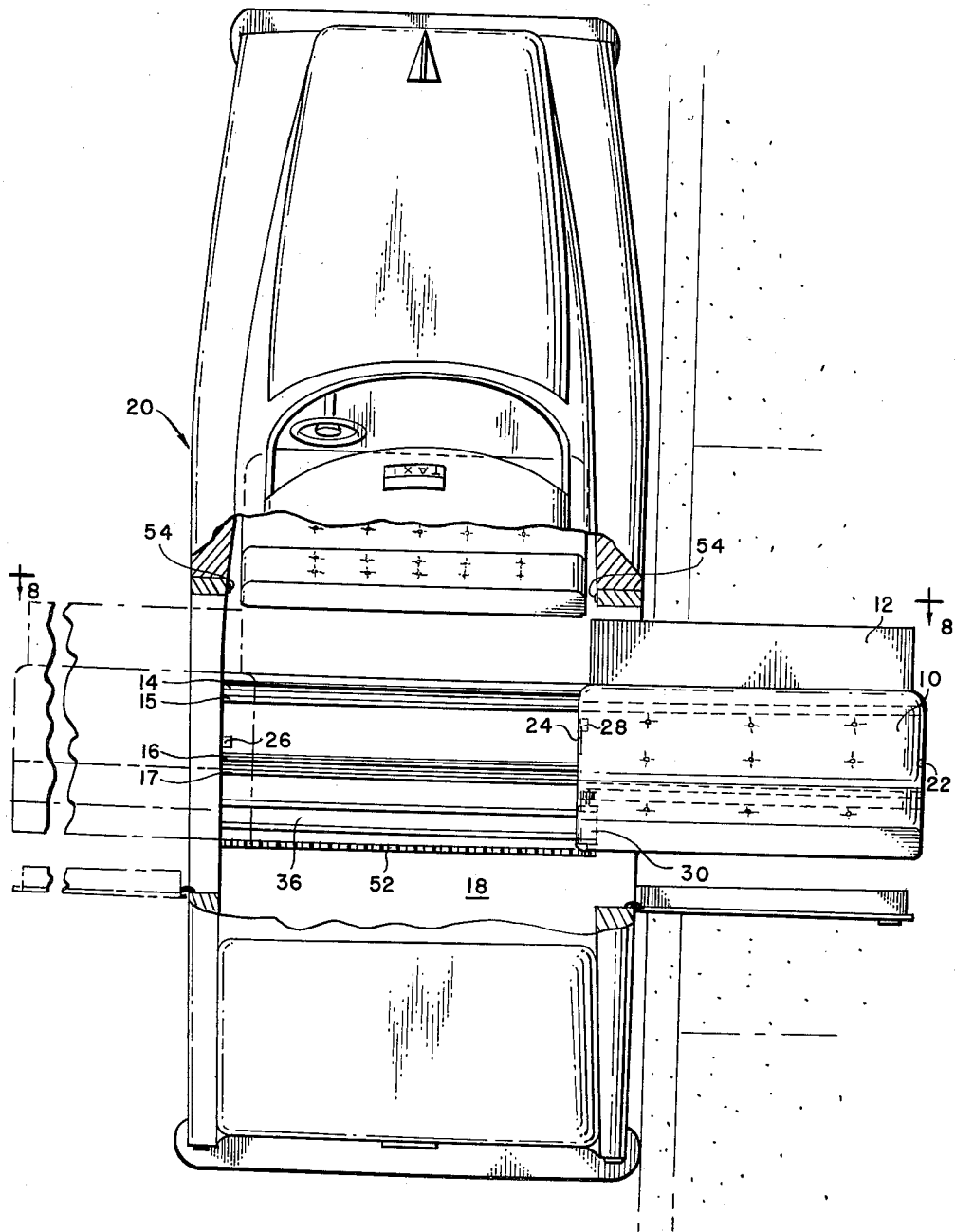
FIG__1
INVENTOR.
FRANK C. SLOAN
BY
Smith & Tuck Jan. 1, 1963
F. C. SLOAN
3,071,407
TRANSVERSELY MOVABLE PASSENGER SEAT FOR
AUTOMOBILES, TAXICABS AND THE LIKE
Filed July 11, 1960
6 Sheets-Sheet 2
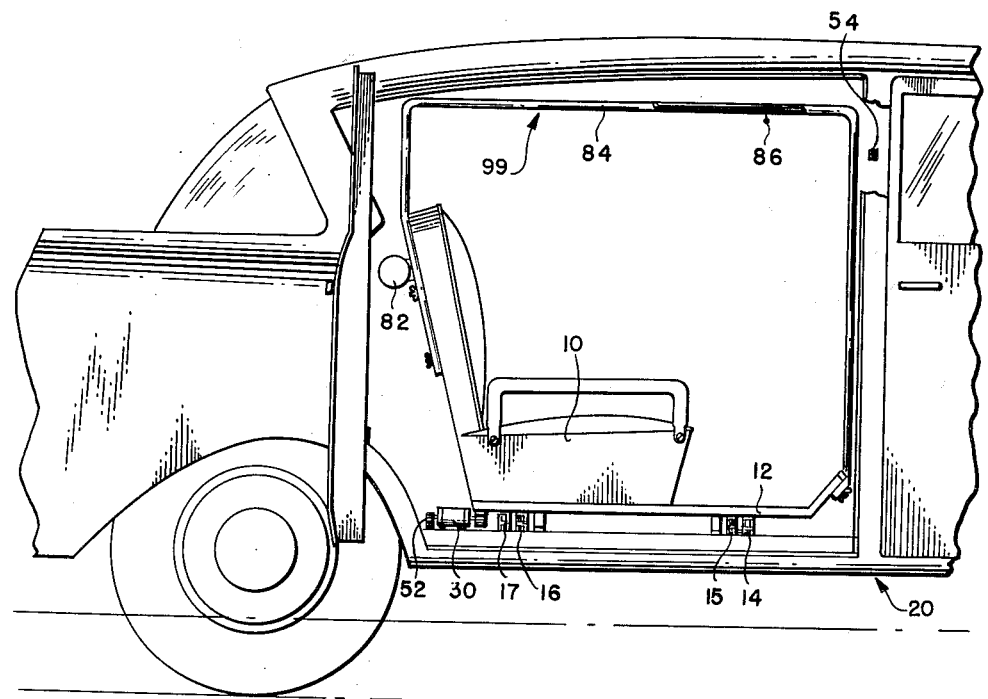
FIG__2
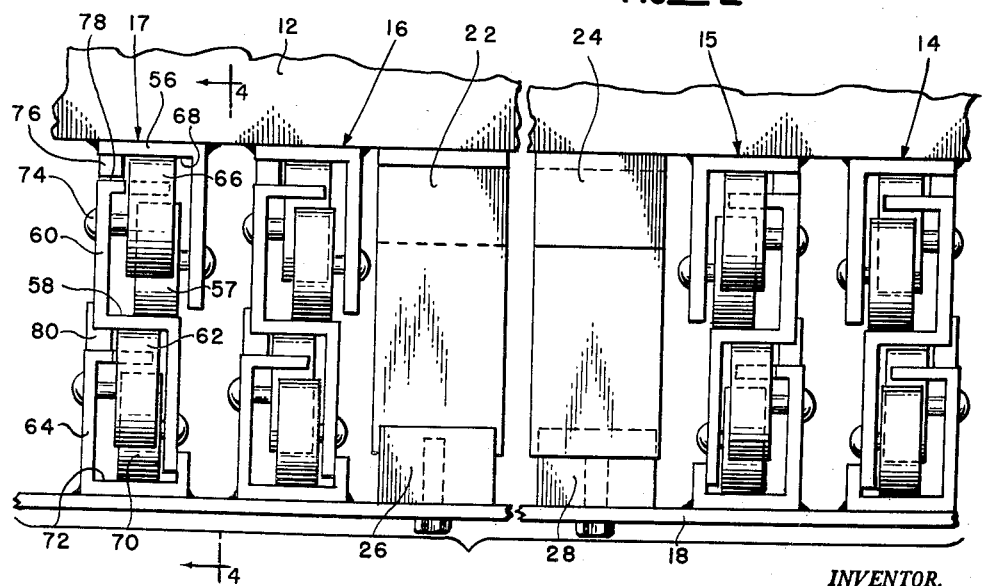
FIG__3
INVENTOR.
FRANK C. SLOAN
BY
Smith & Tuck Jan. 1, 1963
F. C. SLOAN
3,071,407
TRANSVERSELY MOVABLE PASSENGER SEAT FOR
AUTOMOBILES, TAXICABS AND THE LIKE
Filed July 11, 1960
6 Sheets-Sheet 3
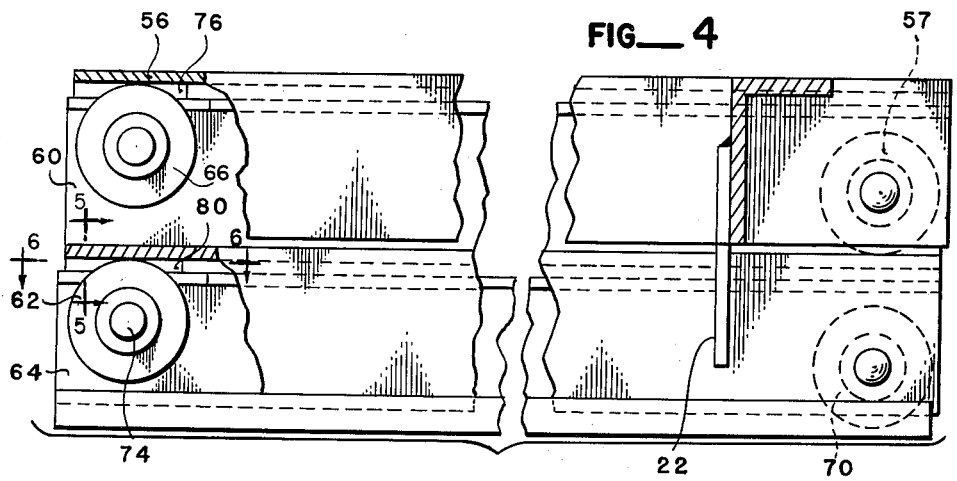
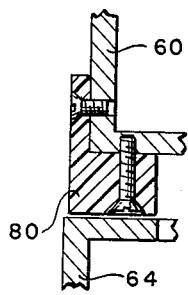
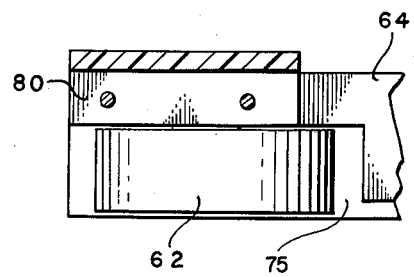
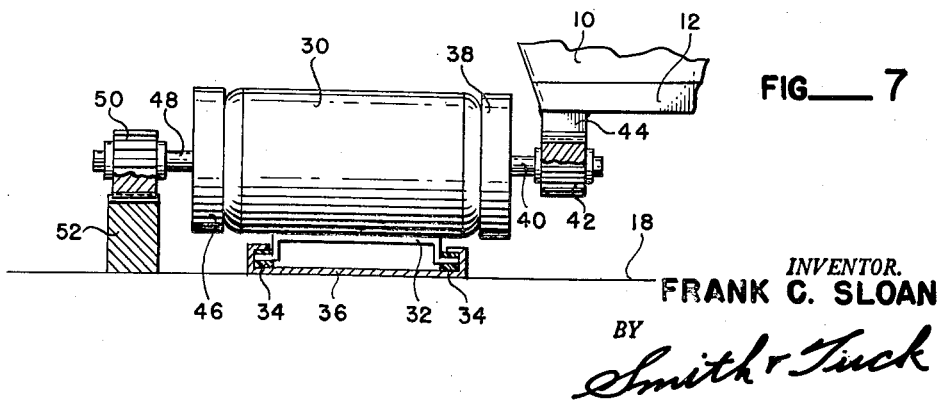
INVENTOR.
FRANK C. SLOAN
BY
*Smith & Tuck*

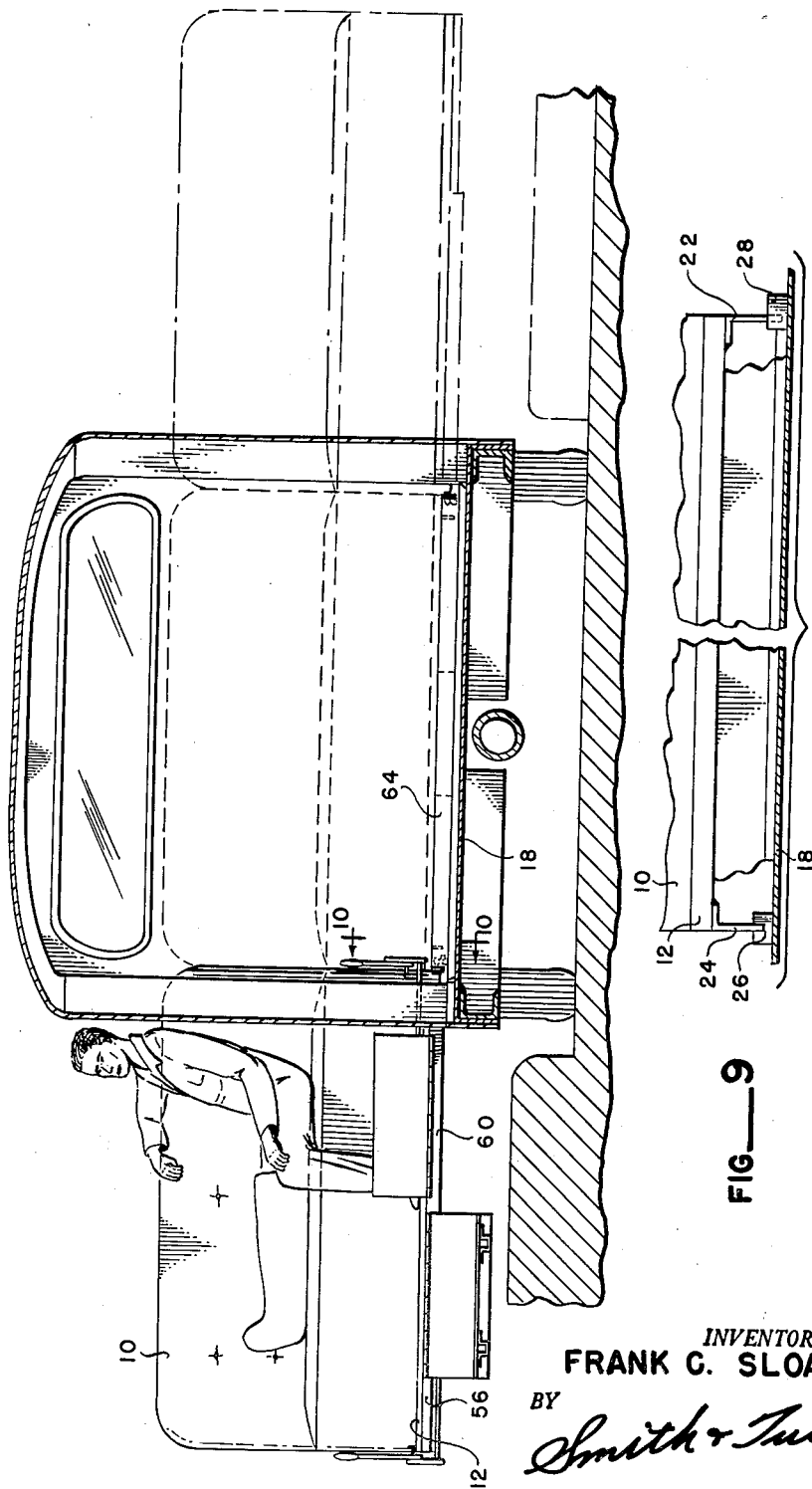

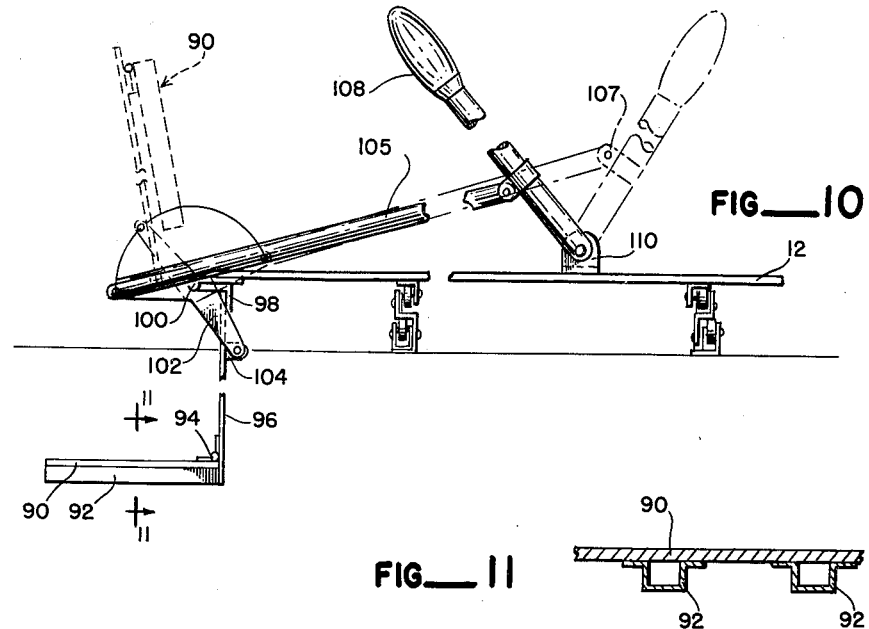
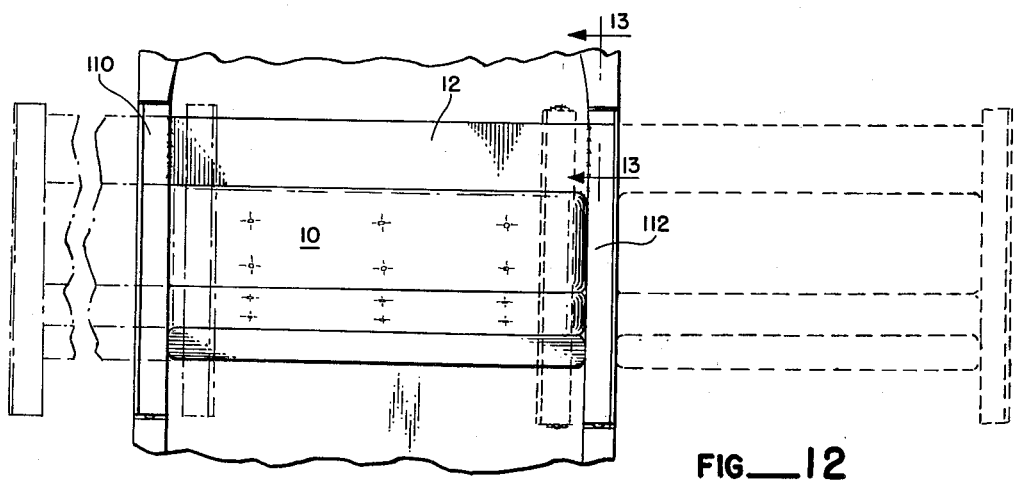
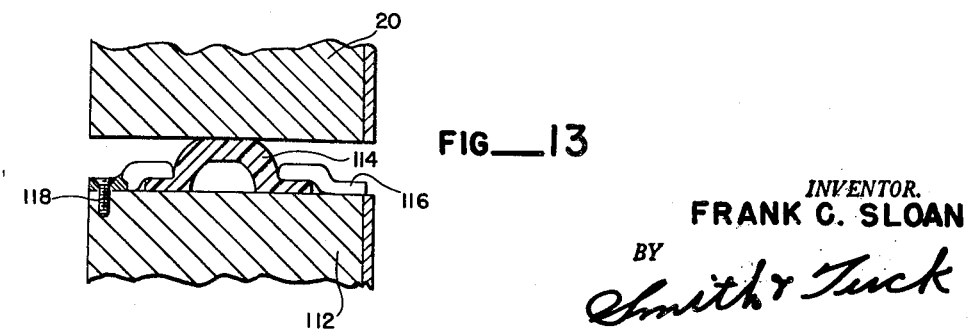

Jan. 1, 1963　　　　　F. C. SLOAN　　　　　3,071,407
TRANSVERSELY MOVABLE PASSENGER SEAT FOR
　　　AUTOMOBILES, TAXICABS AND THE LIKE
Filed July 11, 1960　　　　　　　　　　　6 Sheets-Sheet 6
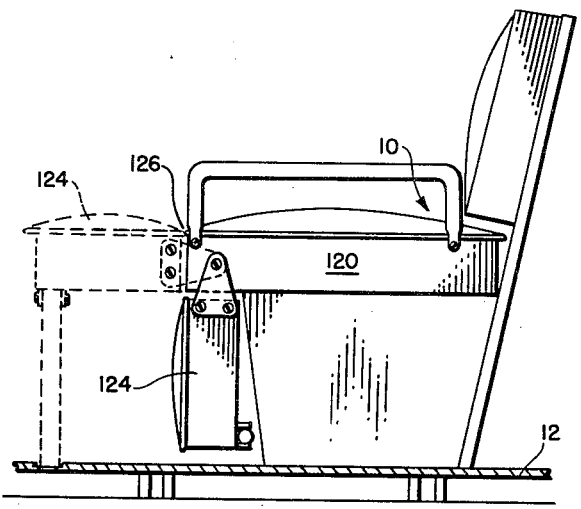
FIG__14
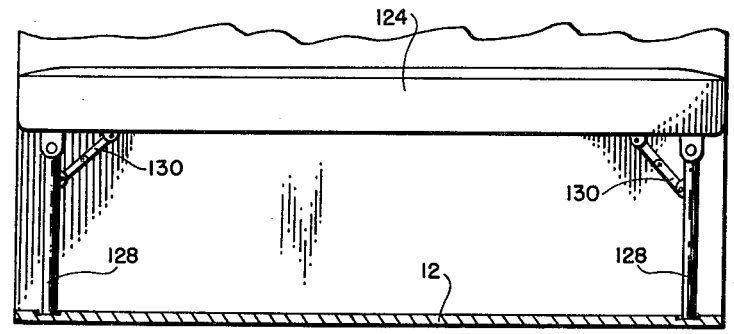
FIG__15
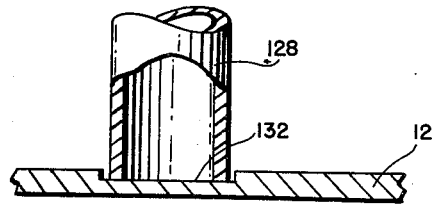
FIG__16
INVENTOR
FRANK C. SLOAN
BY *Smith & Tuck*
ATTORNEY ent. The seat back and cushions are conventional except that they are fixedly secured together and the seat cushion is additionally reinforced on its under side and rigidly mounted upon an open base plate 12. The base, which must move transversely with seat 10, is supported by a suspension system composed of four sets of telescoping slide fixtures, 14, 15, 16 and 17. Fixtures 14 and 16 are a coacting pair designated as a first pair and are spaced apart, 14 near the front and 16 near the rear of base plate 12. Fixtures 15 and 17 similarly are a coacting pair designated as a second pair with 15 near the front and 17 near the rear of base plate 12. These

United States Patent Office 3,071,407
Patented Jan. 1, 1963

3,071,407
TRANSVERSELY MOVABLE PASSENGER SEAT FOR AUTOMOBILES, TAXICABS AND THE LIKE
Frank C. Sloan, 620 Halleck St., Bellingham, Wash.
Filed July 11, 1960, Ser. No. 41,820
4 Claims. (Cl. 296—65)

This present invention relates to the automobile industry and more particularly to a rear passenger seat, especially for taxicabs which may be moved transversely of the axis of the motor vehicle with the entire seat outside the normal sidewalls of the body of the automobile.

The records of taxicab and for rent car operators indicate that a very substantial portion of their patronage, about twenty percent, is by persons of ill health or crippled by disease or injury so that the contortions required to enter and leave the conventional automobile is very difficult for them. Because of the economy of using the standard production automobile body rather than custom bodies built specifically for them the majority of these taxicabs and for hire cars now currently in use are standard four door sedans of the various less expensive makes of American automobiles. These automobiles, following the apparent demands of the individual purchases, are built to standards which put the foot rest portion of the floor at the lowest possible level with the resulting lowering of the roof line of the car body.

The average person usually encounters no great difficulty in entering and leaving this type of automobile but the persons who because of physical handicap cannot make the twists required or is forced to make them at great personal discomfort comprise the class for whom I have provided my improved passenger seat. This improvement is intended largely to serve the users of taxis and for hire cars who are infirm or handicapped and need a semi-ambulance type of transportation.

The present increase in the use of one-way streets makes it necessary to load or unload from either side of the car and this has further complicated the problem. My seat is adaptable by means of a very moderate factory modification of the automobile chassis so that it can be run fully out on either side of the car. With my seat arrangement the entire seat is moved clear of the car body so that it can be entirely loaded with two or three passengers or a single passenger can be loaded by the expedient of sitting on the passenger seat just as they would sit on a chair on an open floor. It is understood that in most cases the seat would be projected out over the sidewalk where there is no interference with the deliberate, convenient seating of the passenger on the seat. The seat is then retracted into the car and the passenger can then be taken to his destination without changing position in any way.

The principal object of my invention therefore is to provide a full-length transverse car seat so supported and actuated by electrical means that the entire seat can be projected beyond the normal vertical projection of the automobile body.

A further object of this invention is to provide means whereby an automobile seat can be projected entirely outside of the car, on either side of the car, so that an infirm, crippled or injured person can be placed upon the seat or seat themselves, or be laid on the seat much as the passenger in an ambulance, except that the passenger lies transversely of the car body.

A further object of this invention is to provide a special vehicle body and seat arrangement particularly adapted for that group of people who find it very difficult to ride in the conventional passenger car and who because of frequent need of transportation are not able to employ a standard ambulance for such transportation.

Further objects, advantages and capabilities will be apparent from the description and disclosure in the drawings, or may be comprehended or are inherent in the invention.

FIGURE 1 is a top plan view of an automobile modified in accordance with my present invention and with certain parts broken away and sectioned to more fully illustrate the capabilities of my present transverse seat arrangement.

FIGURE 2 is a fragmentary vertical side view of the portion of an automobile in which my seat arrangement is incorporated.

FIGURE 3 is an enlarged bracketed end elevation of the track supporting my seat, the same being shown in fragmentary form with part of the intervening space broken away.

FIGURE 4 is a bracketed front elevation of my seat track arrangement taken along the line 4—4 of FIGURE 3.

FIGURE 5 is an elevation, shown in section, taken along the line 5—5 of FIGURE 4 and showing the plastic glide arrangement together with the method of providing a bearing surface therefor.

FIGURE 6 is a horizontal cross sectional view taken along the line 6—6 of FIGURE 4 and showing the plastic glide and a cut away portion around the roller which supports a portion of the seat.

FIGURE 7 is a vertical cross sectional view through the seat actuating motor mounting means.

FIGURE 8 is a transverse cross sectional veiw of an automobile body taken along the line 8—8 of FIGURE 1, showing my seat in its extended position for loading or unloading a passenger.

FIGURE 9 is a bracketed transverse cross sectional view showing the placement of the seat stops.

FIGURE 10 is a transverse cross sectional view of a modified form, taken along the line 10—10 of FIGURE 8 and showing the manner in which the foot rest may be converted into a safety rail for the front of the passenger seat.

FIGURE 11 is a transverse cross sectional view taken along the line 11—11 of FIGURE 10.

FIGURE 12 is a plan view, partly in section, illustrating an alternate method of providing car body doors as an integral part of the seat mechanism rather than employing the customary swinging doors.

FIGURE 13 is an enlarged cross sectional view taken along the line 13—13 of FIGURE 12.

FIGURE 14 is a modified form of sliding seat in which a foldable extension is provided to increase the width of the seat for ambulance type patients.

FIGURE 15 is a front view of the seat of FIGURE 14 but with the extension shown in the raised and using position.

FIGURE 16 is an enlarged fragmentary view, partly in section, showing the means employed to secure the bottom of the legs supporting the extension.

Referring to the drawings, throughout which like reference characters indicate like parts, the numeral 10 designates the passenger seat used with my transverse seat arrangem pairs coact to move and support the base plate and the seat it supports when the plate is moved out one side or the other of the body 20. Each pair is made up of two suspension members composed of three bars as 56, 60 and 64. The lower channel members 64 of the suspension slide are fixedly secured to floor 18 of the car designated generally by the reference character 20. The top angle member 56 is fixedly secured to said base plate. An intermediate off-set structural bar 60 is operatively disposed between said top angle member and said lower channel member. To prevent the seat from moving out too far in the loading and unloading position stops 22 and 24 are mounted on the bottom of seat 10 in line with their respective bumpers 26 and 28 attached to the floor 18 of the car. To facilitate transverse movement of base plate 12 and the seat and fixtures secured thereto it is necessary that sufficient fore and aft space be provided for between the front or driver's seat and the skirting which encloses the front of the rear tires.

Mobility of the unit is provided by an electric motor 30. A suitable means is provided for mechanizing the unit and consists of the reversible electric motor 30, with a base 32, which operatively engages plastic glides 34. These glides are sufficiently free of friction to slide transversely across the car within a suitable channel member 36, attached to the floor 18 of the car. This motor has, attached on the end toward the seat, a reduction gear box 38 and a shaft 40 upon which is fixedly mounted a first spur pinion gear 42. Gear 42 engages a first rack gear 44 which is fixedly attached to the bottom of the seat. On the opposite end of the motor another gear box 46 is located which drives its shaft 48 and the spur pinion gear 50 which in turn engages the second rack gear 52. The rack gear 52 is fixedly attached to the floor 18 of the car. With this arrangement the motor moves in the same direction as the seat; but if gears 44 and 50 are the same size and driven at the same speed, the motor will only move one half as far. In this manner the seat will travel twice the distance of the motor, thus allowing the motor to remain in the car with its gear 42 engaging the seat rack 44 at all times. A control means 54 for said motor is mounted in a convenient location, such as on the posts between the front and rear seats and on both sides. The four slides 14, 15, 16 and 17 are identical with the exception that slides 15 and 17 are disposed to operate toward the right side of the car to carry the seat when operated on that side and slides 14 and 16 are disposed to operate toward the left side of the car to carry the extended load on that side.

Taking slide assembly 17 as an example, a structural angle 56 is fixedly attached to the bottom of the seat. A ball bearing roller 57 is attached on the inside lower right hand corner of angle 56 and bears on the upper surface of web 58 of structural member 60. The under surface of web 58 bears on a roller 62 attached to angle 64 on its inside upper left hand corner. Structural shape 60 carries two rollers, 66 and 70. Roller 66 is attached to the inside upper left hand corner and bears on the under surface 68 of angle structural shape 56. Roller 70 is attached to the inside bottom right hand corner of structural shape 60 and bears on surface 72 of angle 64. The axles of all rollers are fixedly attached to their respective pieces with rivets 74 or another suitable means. The rollers 66 and 62 must project above their respective supporting pieces so a cut-out 75 as shown in FIGURE 6 is provided.

When seat 10 is rolled to one side as in FIGURE 8, the top angle 56 of the slide, which normally supports the seat when rolled in the opposite direction, comes off the end roller and therefore a means has been provided to allow the angle 56 to remain in such a position that it will readily reposition itself upon the correct roller when the seat is returned. A plastic glide 76 is attached to angle 56 and bears on surface 78 of structural shape 60. Glide 80 is attached to structural shape 60 as shown in FIGURE 5. When the roller carries the load, the glides 76 and 80 are slightly displaced from their bearing surfaces as shown also in FIGURE 5.

Located at either end of the bottom of the seat are stops 22 and 24 projecting downwardly so as to engage bumpers 26 and 28 respectively. As shown in FIGURE 9, stop 22 will engage bumper 26 when the seat is rolled to the left and stop 24 will engage bumper 28 when the seat is rolled to the right. Controls 54 will operate on a three position system to allow the reversal of the motor.

In cases where my equipment is installed in an automobile where the seat is so high above the curb or ground that it would be uncomfortable for the passenger to seat himself or leave the extended seat, an intermediate step 90 is provided. Such a step with retractable means has been illustrated in FIGURE 10. The step is strengthened with stiffeners 92. A hinge 94 is provided and attaches the step to its back support 96 in such a manner as to support the passenger when the apparatus is down and to fold flat against its support when in the raised position. The back support 96 is fixedly attached to hinge 98 whose other arm is attached to the base 12 of the seat. Pivotably attached to the center of the hinge 100 is a bell crank 102, one arm of which is pivotably attached to angle 104, which is fixedly connected to back support 96 and the other arm is pivotably attached to the connecting bar 105 which is connected by a band 107, fixedly attached to lever 108 which in turn is pivotably connected to the base 12 by the seat projection 110. The bell crank is of such an angle that when lever 108 is pushed forward the step will lower and allow the hinge arm 98 to bear against the bottom of the base 12. The entire assembly of the bell crank, connecting arm, and lever will aid in supporting the weight of the passenger. When lever 108 is pulled back, the lower assemblies 96 and 90 will rise and hinge 94 will allow step 90 to drop in a closed position as shown in dotted line of FIGURE 10.

A modified form of this system allows the doors to be an integral part of the sliding seat system as shown by FIGURE 12. The doors 110 and 112 are fixedly attached to the seat 10 and its base 12, and would thus move with the seat at is is extended to either side. Since one of the doors will slide through the car's interior each time the seat is extended, each door will be slightly smaller than its opening, with a suitable means on its perimeter for excluding the outside atmosphere when in a closed position. One method is shown in FIGURE 13 where a resilient strip of material 114, such as neoprene or rubber, is held to the edge of the door by a suitable clamp 116 held in place by a plurality of screws 118. The material 114 will effectively operate as a sound insulator while the car is in motion.

Means are provided for protection from rain while using the seat in its extended position as shown in FIGURE 2. A curtain 86 may be pulled from its container 82, along a guideway 99 formed by rods 84, as far as desired.

Referring to FIGURES 14, 15 and 16 a further modification of seat assembly 10 is provided so that the seat can be made of increased width to take care of a reclining passenger and thus permit the transportation of a person who otherwise would of necessity have to engage an ambulance. Pivotably secured to the frame of the seat cushion 120 of the seat assembly 10 I provide the extension portion 124. The construction of this portion follows normal seat construction in that it is padded, preferably with a combination of foam material and coil springs so that a relatively firm surface is provided. As will be noted in FIGURE 14 a lengthwise depression is provided at 126 which tends to give anchorage for instance to a leg in a cast or some such affliction and permits the passenger to more easily accept acceleration, or sudden or unexpected stops. It is desirable to provide supporting legs as 128 pivoted to seat portion 124 and having toggle locking means 130. This provides a support that can be visually observed and is considered much safer than any hidden latch arrangement. The idea of safety is further carried out by having the lower ends of legs 128 fit into shallow depressions as 132 formed in the surface of base member 12 on which seat 10 is mounted and which moves outwardly with it.

It is believed it will be apparent from the above description and the disclosure in the drawings that the invention comprehends a novel construction of a transversely movable passenger seat for automobiles, taxicabs and the like.

Having thus disclosed the invention.

I claim:

1. A transversely movable rear seat for automobiles used in providing semi-ambulance type of transportation for persons, comprising: a multi-seated automobile having a body with sufficient fore and aft space between its driver's seat and its rear wheels to permit a rear seat of normal height to be moved transversely outside said body on either side of the body; a base plate disposed for movement transversely of an automobile body; anti-friction suspension means for said plate adapted to carry said plate substantially entirely beyond the vertical projection of said automobile body in which it may be used and on either side of said body; said suspension means adapted to fully support said base plate on either side of said automobile body for loading or discharging passengers; a seat cushion and a back cushion fixedly secured together and rigidly mounted on said base plate; rotary power means for moving said base plate transversely of said automobile; said anti-friction suspension means comprising a first pair and a second pair of sets of spaced apart telescoping slide fixtures disposed transversely of said automobile body and under said base plate, said first pair disposed for movement and support of said seat outwardly from one side of said body and the second pair disposed to provide movement and support of said seat outwardly from said body but on the side opposite from said first set; said first pair and said second pair of slide fixtures comprising two spaced apart suspension member, each composed of three bars, a top angle member, a lower channel member; an intermediate off-set structural bar; antifriction means operatively spacing said three bars; said rotary power means for moving said base plate comprising a reversible electric motor having a base; glides disposed to operatively engage said base and channel means for positioning and guiding said glides to provide a controlled movement for said motor transversely of said automobile body; a first rack gear fixedly secured to said base plate and transversely of said body; a first pinion gear, secured to the shaft of said motor, and operatively engaging said first rack gear; a second rack gear fixedly secured to the said body, parallel to said first rack gear; a second pinion gear secured to the motor shaft and operatively engaging said second rack gear and control means for said motor.

2. A transversely movable rear seat for automobiles used in providing semi-ambulance type of transportation for persons, comprising: a multi-seated automobile having a body with sufficient fore and aft space between its driver's seat and its rear wheels to permit a rear seat of normal height to be moved transversely substantially entirely outside said body on either side of the body; a rear seat disposed for movement transversely of an automobile body; anti-friction suspension means for said seat for carrying said seat substantially entirely beyond the vertical projection of said automobile body in which it may be used and on either side of said body; said suspension means fully supporting said seat on either side of said automobile body for loading or discharging passengers; rotary power means for moving said seat transversely of said automobile; said anti-friction suspension means comprising a first pair and a second pair of sets of spaced apart telescoping slide fixtures disposed transversely of said automobile body and under said seat, said first pair for movement and support of said seat outwardly from one side of said body and the second pair disposed to provide movement and support of said seat outwardly from said body but on the side opposite from said first set; said first pair and said second pair of slide fixtures comprising two spaced apart suspension members, each composed of three bars, a top angle member, a lower channel member; an intermediate off-set structural bar; anti-friction means operatively spacing said three bars; said rotary power means for moving said seat comprising a reversible electric motor having a base; glides disposed to operatively engage said base and channel means for positioning and guiding said glides to provide a controlled movement for said motor transversely of said automobile body; a first rack gear fixedly secured to said seat and transversely of said body; a first pinion gear secured to the shaft of said motor, and operatively engaging said first rack gear to move said seat transversely of said automobile; a second rack gear fixedly secured to the said body, parallel to said first rack gear; a second pinion gear secured to the motor shaft and operatively engaging said second rack gear and control means for said motor to move said motor and said seat transversely of said automobile with the motor moving substantially one half as far as said seat.

3. The combination according to claim 2 further providing that said antifriction means operatively spacing said bars comprises: rollers secured to each of said top angle and lower channel members and said intermediate offset bar; said intermediate offset bar having a horizontal web providing an upper roller bearing surface for the rollers secured to said top angle member and a lower roller bearing surface for the rollers secured to said lower channel members; said top angle members providing an under bearing surface for rollers revolvably secured to the upper portion of the said offset structural bar and said lower channel member forming a bearing surface for rollers revolvably secured to the lower portion of said offset bar.

4. A transversely movable rear seat for automobiles used in providing semi-ambulance type of transportation for persons, comprising: a multi-seated automobile having a body with sufficient fore and aft space between its driver's seat and its rear wheels to permit a rear seat of normal height to be moved transversely outside said body on either side of the body; a base plate disposed for movement transversely of an automobile body; antifriction suspension means for said plate adapted to carry said plate substantially entirely beyond the vertical projection of said automobile body in which it may be used on at least one side of said body; said suspension means adapted to fully support said base plate in its fully extended position for loading or discharging passengers; a seat cushion and a back cushion mounted on said base plate; rotary power means for moving said base plate transversely of said automobile; said anti-friction suspension means comprising telescoping slide means disposed transversely of said automobile body and under said base plate for slidingly supporting said base plate; said rotary power means for moving said base plate comprising a reversible electric motor having a base; glides disposed to operatively engage said base and channel means for positioning and guiding said glides to provide a controlled movement for said motor transversely of said automobile body; a first rack gear fixedly secured to said base plate and transversely of said body; a first pinion gear, secured to the shaft of said motor, and operatively engaging said first rack gear; a second rack gear fixedly secured to the said body, parallel to said first rack gear; a second pinion gear secured to the motor shaft and operatively engaging said second rack gear and control means for said motor.

References Cited in the file of this patent

UNITED STATES PATENTS

| | | |
|---|---|---|
| 2,753,947 | Mach | July 10, 1956 |
| 2,758,872 | Solomon et al. | Aug. 14, 1956 |